US010735409B2

(12) United States Patent
Krempel et al.

(10) Patent No.: US 10,735,409 B2
(45) Date of Patent: Aug. 4, 2020

(54) AUTHENICATION STICK (71) Applicant: Fraunhofer-Gesellschaft zur Foerderung der angewandten Forschung e. V., Munich (DE)

(72) Inventors: Erik Krempel, Karlsruhe (DE); Mario Kaufmann, Karlsruhe (DE)

(73) Assignee: Fraunhofer-Gesellschaft zur Foerderung der angewandten Forschung e.V., Munich (DE)

(\*) Notice: Subject to any disclaimer, the term of this patent is extended or adjusted under 35 U.S.C. 154(b) by 184 days.

(21) Appl. No.: 15/467,763

(22) Filed: Mar. 23, 2017

(65) Prior Publication Data

US 2017/0201513 A1 Jul. 13, 2017

Related U.S. Application Data (63) Continuation of application No. PCT/EP2015/071364, filed on Sep. 17, 2015.

(30) Foreign Application Priority Data

Sep. 24, 2014 (DE) ........................ 10 2014 219 297

(51) Int. Cl.
H04L 29/06 (2006.01)
H04W 12/06 (2009.01)
H04L 9/32 (2006.01)

(52) U.S. Cl.
CPC ........ H04L 63/0853 (2013.01); H04L 9/3226 (2013.01); H04L 63/0428 (2013.01);
(Continued)

(58) Field of Classification Search
CPC ... H04L 9/3226; H04L 63/0428; H04L 63/06; H04L 63/083; H04L 2463/081; H04L 63/0853; H04W 12/06
(Continued)

(56) References Cited

U.S. PATENT DOCUMENTS 5,633,934 A \* 5/1997 Hember ................. H04L 29/06
713/192
7,251,330 B2 \* 7/2007 Terao ..................... G06F 21/10
380/255

(Continued)

FOREIGN PATENT DOCUMENTS

GB 2496354 A 5/2013
JP 2005122402 A 5/2005
(Continued)

OTHER PUBLICATIONS

Agilebits, Inc., "1Password Simple, Convenient Security", Agilebits (Agilebits 1Password Simple, Convenient Security), agilebits.com, [online], [retrieved on: Mar. 9, 2017], Retrieved from: <http://agilebits.com/onepassword/>, 2015, 2 pages, 2015, 2 pages.
(Continued)

Primary Examiner — David J Pearson
Assistant Examiner — Badri Narayanan Champeksan
(74) Attorney, Agent, or Firm — Perkins Coie LLP; Michael A. Glenn (57) ABSTRACT A communication adapter for authentication of a user includes a receiving unit for receiving encrypted credentials, a decryption unit for decrypting the encrypted credentials and an output unit for outputting the decrypted credentials to a terminal device.

9 Claims, 3 Drawing Sheets (52) U.S. Cl.
CPC ............ *H04L 63/06* (2013.01); *H04L 63/083* (2013.01); *H04W 12/06* (2013.01); *H04W 12/0608* (2019.01); H04L 2463/081 (2013.01)

(58) Field of Classification Search
USPC ........................................................ 713/168
See application file for complete search history.

(56) References Cited

U.S. PATENT DOCUMENTS

| | | | | |
|---|---|---|---|---|
| 8,280,465 | B2* | 10/2012 | Dorogusker | H01R 31/065 455/41.1 |
| 8,498,618 | B2* | 7/2013 | Ben Ayed | H04L 63/0492 455/41.2 |
| 9,135,425 | B2* | 9/2015 | Yau | G06F 21/35 |
| 9,336,402 | B2* | 5/2016 | Wong | G06F 21/62 |
| 9,361,619 | B2* | 6/2016 | Varadarajan | H04L 63/0853 |
| 9,722,977 | B2* | 8/2017 | Hars | G06F 21/00 |
| 2005/0086497 | A1* | 4/2005 | Nakayama | G06F 21/32 713/185 |
| 2005/0149745 | A1* | 7/2005 | Ishidoshiro | G06F 21/602 713/189 |
| 2009/0036164 | A1* | 2/2009 | Rowley | H04L 9/3234 455/558 |
| 2009/0310781 | A1* | 12/2009 | Kim | H04L 9/0861 380/247 |
| 2010/0293382 | A1* | 11/2010 | Hammad | G06F 21/34 713/173 |
| 2010/0327054 | A1* | 12/2010 | Hammad | G06F 21/34 235/375 |
| 2011/0053556 | A1* | 3/2011 | Masaryk | G06F 3/03541 455/406 |
| 2012/0018506 | A1* | 1/2012 | Hammad | G06F 21/34 235/375 |
| 2012/0124370 | A1* | 5/2012 | Choi | H04L 63/067 713/159 |
| 2012/0297190 | A1* | 11/2012 | Shen | H04L 9/0866 713/168 |
| 2014/0149742 | A1* | 5/2014 | Yau | H04L 63/083 713/159 |
| 2014/0149746 | A1* | 5/2014 | Yau | G06F 21/35 713/185 |
| 2014/0232524 | A1* | 8/2014 | Nakai | B60R 25/24 340/5.61 |
| 2014/0375423 | A1* | 12/2014 | Lagabe | B60R 16/02 340/5.61 |

FOREIGN PATENT DOCUMENTS

| | | |
|---|---|---|
| JP | 2009245020 A | 10/2009 |
| WO | 2013123453 A1 | 8/2013 |

OTHER PUBLICATIONS

Bonn, "BSI gibt Tipps Fuer sichere Passwoerter", Bonn(BSI gibt Tipps Fuer sichere Passwoerter) bsi.bund.de [online]<https://www.bsi.bund.de/DE/Presse/Pressemitteilungen/Presse2011/Passwortsicherheit_27012011.html>, Jan. 27, 2011, Jan. 27, 2011, 2 pages.

Inputstick, "InputStick", InputStick (InputStick), Inputstick.com, [online], [retrieved on: Mar. 9, 2017], Retrieved from: <http://inputstick.com/index.php/en/> 2017, 3 pages., 2017, 3 pages.

Intel Corp.And Microsoft Corp., "PC 99 System Design Guide", A Technical Reference for Designing PCs and Peripherals for the Microsoft Windows Family of Operating Systems, 1999, 512 pages.

Lastpass, "LastPass Password Manager, Auto Form Filler, Random Password . . . ", LastPass (LastPass Password Manager, Auto Form Filler, Random Password . . . ), Lastpass.com, [online], [retrieved on: Mar. 9, 2017], Retrieved from: <https://www.lastpass.com/>, 2017, 5 pages., 2017, 5 pages.

Lee, Joel, "3 Tools for Turning Your USB Drive Into a Secure Unlock Key for Your PC", Lee (Lee 3 Tools for Turning Your USB Drive Into a Secure Unlock Key for Your PC), makeuseof.com, [online], Retrieved from: <http://www.makeuseof.com/tag/3-tools-turning-usb-drive-secure-unlock-key-pc/>, Sep. 16, 2014, 8 pages., Sep. 16, 2014, 8 pages.

Mobilevaults, LLC., "Mobile Vaults Forget Remembering and Changing Passwords", Mobilevaults, LLC. (Mobile Vaults Forget Remembering and Changing Passwords), mobilevaults.com, [online], [retrieved on Apr. 11, 2017], Retrieved from: <https://www.mobilevaults.com/>, 2017, 1 page., 2017, 1 page.

Myidkey, "myIDkey Using myIDkey", myIDkey (myIDkey Using myIDkey), myidkey.com, [online], [retrieved on: Mar. 9, 2017], Retrieved from: <https://web.archive.org/web/20140720075959/http://myidkey.com . . . >, 2014, 2 pages., Cannot see the rest of the website (from pdf) & website client sent is not found., 2014, 2 pages.

Password Safe, "Password Safe—Passwortverwaltung", Password Safe (Password Safe—Passwortverwaltung), Passwordsafe.de, [online], [retrieved on: Mar. 9, 2017], Retrieved from: <http://www.passwordsafe.de/support/features/uebersicht-version-7.html>, 6 pages, publication date unknown, 6 pages.

Reichl, Dominik, "KeePass Password Safe", Reichl (Reichl KeePass Password Safe), Keepass.info, [online], [retrieved on: Mar. 9, 2017], Retrieved from: <http://keepass.info/>, 2013, 1 page., Copyright 2003-2017, 2003, 1 page.

Schraeder, Daniel, "Bluetooth Beim Notebook Nachruesten? Der Mini-Dongle Machts!", (Bluetooth Beim Notebook Nachruesten? Der Mini-Dongle Machts!), cnet.de, [online], Retrieved from:<https://web.archive.org/web/20150417014513/http://www.cnet.de:80/41207492/bluetooth-beim-notebook-nachruesten-der-mini-dongle-macht-s/>, May 27, 2009, May 27, 2009, 2 pages.

Skygears, "Air Keyboard FAQ", SkyGears (Air Keyboard FAQ), airkeyboardapp.com, [online], Retrieved from: <https://web.archive.org/web/20140827201050/http://www.airkeyboardapp.com/faq>, 2014, 6 pages., 2014, 6 pages.

Tesline-Service. S.R.L, "Rohos Logon Key", Tesline-Service. S.R.L. (Tesline-Service. S.R.L. Rohos Logon Key), Rohos.com, [online], [retrieved on: Nov. 27, 2015], Retrieved from: <https://web.archive.org/web/20140803014541/http:/www.rohos.com/products/rohos-logon-key/>, 2005, 4 pages., 2005, 4 pages.

Yubico AB, "The YubiKey Manual", Yubico Version: 3.3, Sep. 17, 2014, 42 pages.

* cited by examiner

AUTHENICATION STICK

CROSS-REFERENCE TO RELATED APPLICATIONS

This application is a continuation of copending International Application No. PCT/EP2015/071364, filed Sep. 17, 2015, which is incorporated herein by reference in its entirety, and additionally claims priority from German Application No. DE 10 2014 219 297.8, filed Sep. 24, 2014, which is incorporated herein by reference in its entirety.

Embodiments of the present invention relate to a communication adapter for authentication of a user. Further embodiments relate to a system of authentication as well as a method for authentication of a user.

BACKGROUND OF THE INVENTION

For authentication purposes, passwords are frequently used in information technology. Humans have difficulty in remembering safe passwords. According to a recommendation by the German Federal Office for Information Security (BSI—Bundesamt für Sicherheit in der Informationstechnologie), passwords should be at least 8 characters in length and also include digits and special characters in addition to letters (see reference [1], for example). In addition, one should create a dedicated password for each application. This means that the user has to remember an extensive list of long and complex passwords. Moreover, entering of said passwords on a terminal device by means of a keyboard is very inconvenient and prone to errors.

Password managers (wide-spread systems are shown in references [2], [3], [4] and [5], for example) are software which enables managing many passwords. By means of said software, safe passwords may be automatically created and stored. If a password manager is installed on a PC, the password may be copied to the clipboard and then be inserted into the password dialog. This solution has the disadvantage, for example, that it involves the user logging into a PC so as to access his/her password manager. For example, login into the operating system cannot be performed with the aid of a password manager. To be able to be used, the password manager may be installed. This may be prohibited, e.g., in the event of computers used at the place of work or in the event of internet cafés. Furthermore, one has to trust the device on which the password manager is installed. This is critical in particular with devices the user is not familiar with. Moreover, when using the password manager on different devices, the user may synchronize the list of passwords between all said devices.

In addition, situations may arise wherein the dialog for password entry is not displayed on the same device on which the password manager is installed. This may be the case if a person manages a very large number of devices and does not want to install the password manager on all of them, or if the login performed is into a device the user is not familiar with. To log in here with a password stored within the password manager, the user may have the password displayed to him/her on another device and then manually type the password into the password dialog. This is not only very inconvenient but also represents a significant security loophole since other persons can see the password.

A further possibility of preventing passwords from being displayed in plain text on a device prior to being entered consists in having pairs of a mobile terminal device (e.g. a smartphone) and a software which runs on the device on which a user wants to log in (see reference [6], for example). When a password is needed, the user prompts its mobile terminal device to transmit the password to the software installed for this purpose. Said software receives the data and forwards it to the dialog for login. This prevents the password from being displayed on a screen. This possibility also has considerable disadvantages; for example, the corresponding software may be installed on all devices on which a user wants to log in. Moreover, the user may already have logged into a PC so as to be able to access his/her stored passwords. In addition, for each device on which the system is to be applied, coupling may be performed between the mobile terminal device and that device which prompts login.

A further, currently known possibility provides utilization of specific hardware (see reference [7], for example). To this end, credentials, i.e. pairs of user names and passwords, are stored on a device similar to a USB stick. When a user needs a password, he/she authenticates himself/herself with the special hardware and can read the user name and the password from the display. However, this possibility has the disadvantages that the password is displayed in plain text and is manually entered on the device. The specific hardware comprising a display is expensive and needs to be taken along everywhere.

Furthermore, an input stick (see reference [8], for example) is known which solves many of the known problems. The input stick may pass itself off as a standard keyboard toward a PC. By means of a suitable application on a smartphone, passwords may be managed, selected and then sent to a PC. For the PC, this transmission looks as if the password is sent by a commercial keyboard. Thus, installation of software on the PC is not necessary. However, this solution has the drawback that the passwords are stored on the mobile phone. This represents a considerable security problem even if security mechanisms are employed, for example in that the database of the passwords is encrypted. Since even passwords which are stored in an encrypted manner may be decrypted prior to being sent to the input stick, there is the risk that an attacker may extract said passwords. Since one has observed the trend that the number of attacks onto mobile platforms continuously increases, this represents a considerable security problem.

SUMMARY

According to an embodiment, a communication adapter for authentication of a user may have: a receiving unit for receiving encrypted credentials; a decryption unit for decrypting the encrypted credentials; an output unit for outputting the decrypted credentials to a terminal device; wherein the output unit can be connected to an interface on the terminal device and wherein the interface on the terminal device is suitable for inputting keyboard signals; wherein the receiving unit is configured to receive the encrypted credentials from a mobile input device; wherein the mobile input device is configured to output the encrypted credentials to the receiving unit via a radio link.

According to another embodiment, a system for authentication of a user on a terminal device may have: an inventive communication adapter; a mobile input device configured to store encrypted credentials from a user and to output same to the receiving unit of the communication adapter; and a terminal device configured to receive the decrypted credentials from the output unit.

According to another embodiment, a method for authentication of a user may have the steps of: receiving encrypted credentials from a mobile input device via a radio link;

decrypting the encrypted credentials; outputting the decrypted credentials to a terminal device via an interface, suited for inputting keyboard signals, on the terminal device.

According to another embodiment, a non-transitory digital storage medium may have a computer program stored thereon to perform the inventive method when said computer program is run by a computer.

Embodiments of the present invention provide a communication adapter for authentication of a user. The communication adapter includes a receiving unit for receiving encrypted credentials, a decryption unit for decrypting the encrypted credentials, and an output unit for outputting the decrypted credentials to a terminal device.

The core of the invention is the communication adapter, which offers the possibility of transferring user names, passwords or other digital information from, e.g., a mobile terminal device or a mobile input device to a terminal device or any other device. In this context, what is stored on the mobile input device is not the decrypted credentials (passwords) but merely specifically encrypted credentials, or encrypted data. Even if the mobile input device is lost or if all of the stored credentials are stolen, they will be useless for an attacker. The decrypted credentials, or the correct passwords, may be calculated only from the combination of the encrypted credentials (stored on the mobile input device) and the user's communication adapter. For this purpose, one can use only that very communication adapter which belongs to the user rather that any random communication adapter.

In an advantageous implementation, the output unit may be connected to an interface on the terminal device, the interface on the terminal device being suitable for inputting keyboard signals. By means of an interface on a terminal device which is suitable for inputting keyboard signals and can be connected to the output unit of the communication adapter, the output unit of the communication adapter may simulate entry of the decrypted credentials, e.g. of a password, on the input device by a user.

In a further advantageous implementation, the output unit is configured to output the credentials in a format of a standard keyboard. By outputting the credentials in the format of a standard keyboard, the communication adapter may be connected to a terminal of the terminal device which is provided for keyboard entry, the terminal device receiving the keyboard signals generated by the output unit of the communication adapter.

In a particularly advantageous implementation, the receiving unit is configured to receive the encrypted credentials from a mobile input device. A mobile input device in most cases is a device the user frequently carries along, which is why the mobile input device is within the user's personal range of access.

In an advantageous implementation, the decrypted credentials include a first password, and/or the decryption unit is configured to decrypt the encrypted credentials by means of a second password. For authentication in case of rights of access to specific data, programs, documents or areas, passwords are most frequently used. However, it is also possible to employ biometric data such as fingerprints or iris scans as credentials. Moreover, it is possible, for example, to encrypt the credentials with a long-lived secret, for example a sentence.

In an advantageous implementation, the communication adapter is configured to store the second password within a memory. The second password may be stored within a memory, e.g. within the communication adapter, so as to be forwarded to the decryption unit as need be. However, the second password may also be received via an additional input unit of the communication adapter or may be output by the terminal device to the communication adapter.

In a further advantageous implementation, a plurality of second passwords are stored within the communication adapter, and the second password is dependent on an application for which the user authenticates himself/herself. Due to there being a plurality of stored second passwords within the communication adapter, a specific second password may be used as a function of the application for which the user authenticates himself/herself. Thus, the level of protection against unauthorized access is increased since every application uses a dedicated second password.

In a particularly advantageous implementation, the second password is dependent on a user who wants to authenticate himself/herself. By using a second password, which is dependent on the user, the level of protection against unauthorized access is also increased. Moreover, when different second passwords are used, it will not be possible for any user to draw any conclusions as to the credentials of the other users on the basis of his/her credentials encrypted with the second password. The communication adapter may thus be utilized by several users.

In a further advantageous implementation, the communication adapter is configured to generate the second password in an automated manner. Passwords generated in an automated manner may be passwords which are not related to the user and are thus more difficult to guess for others. Moreover, automatically generated passwords may have any length desired.

In one embodiment, a system for authentication of a user on a terminal device includes a communication adapter and a mobile input device configured to store a user's encrypted credentials and to output same to the receiving unit of the communication adapter, and a terminal device configured to receive the decrypted credentials from the output unit. Mobile input devices are particularly suited for storing the encrypted credentials since they are often employed by one user only. They thus represent a personal article of daily use which the user frequently carries on him/her and which is thus available to the user at any time. Moreover, in addition to a sufficiently large memory, mobile input devices often exhibit different communication interfaces by means of which they can exchange data with other devices.

In an advantageous implementation, the mobile input device is configured to output the encrypted credentials to the receiving unit via a radio link. By means of a radio link, data may be transmitted from a mobile input device to the communication adapter without any additional hardware requirements such as a cable, for example.

In a particularly advantageous implementation, the mobile input device is configured to generate first passwords or second passwords in an automated manner. It is possible, on the mobile input device, to generate—by means of corresponding software and at a comparatively small expenditure—passwords which exhibit the above-described advantages of passwords generated in an automated manner (length, no relation to user).

In addition, a method for authentication of a user is provided which includes the following steps:
  receiving encrypted credentials.
  decrypting the encrypted credentials.
  outputting the decrypted credentials to a terminal device.

Moreover, a computer program having a program code for performing the above-described method, when the computer program runs on a computer or processor, is provided.

BRIEF DESCRIPTION OF THE DRAWINGS

Embodiments of the present invention will be detailed subsequently referring to the appended drawings, in which.

DETAILED DESCRIPTION OF THE INVENTION

In the subsequent description of the embodiments of the invention, elements which are identical or equivalent will be provided with identical reference numerals in the figures, so that their descriptions are interchangeable in the different embodiments.

Figure 1:
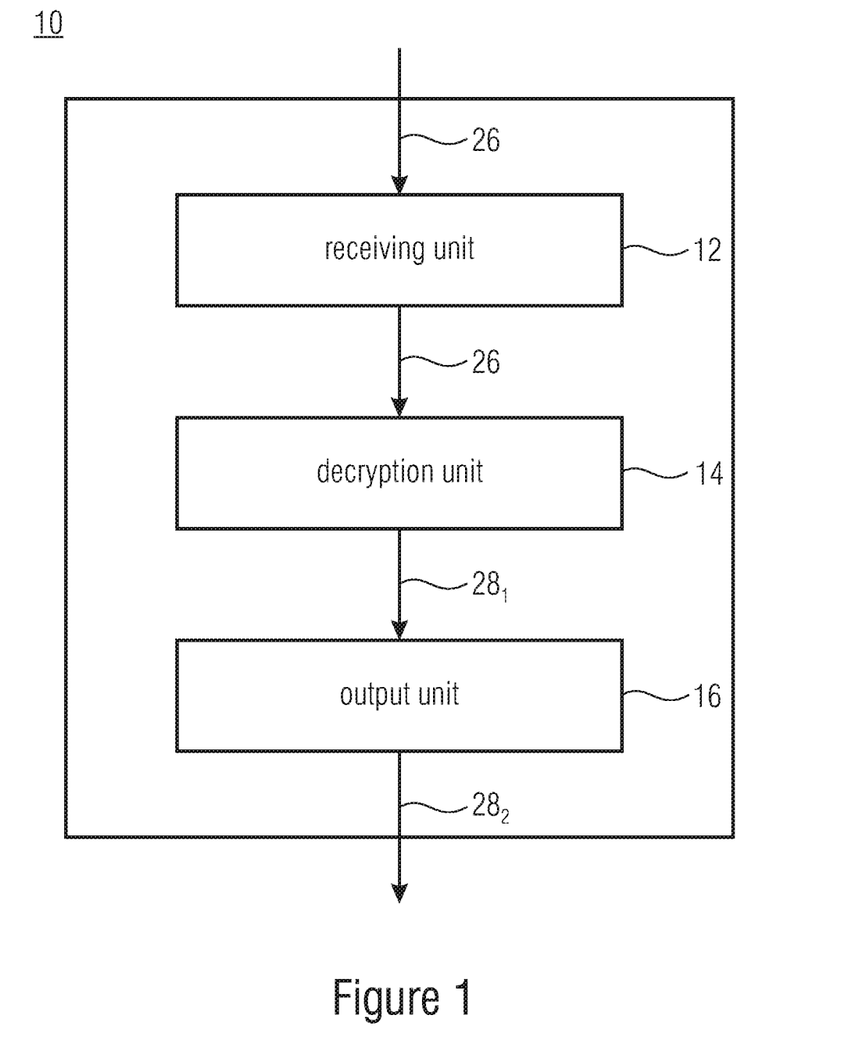
FIG. 1 shows a schematic representation of an embodiment of a communication adapter.

FIG. 1 shows a schematic representation of an embodiment of a communication adapter 10 for authentication of a user. Authentication may be understood to mean a user's contribution so as to provide evidence of an alleged property of an entity by means of said contribution. Subsequently, said authentication is confirmed, for example, by a server by in an authenticated manner. The user may be person or a group of persons. However, it is also possible for a device or an apparatus to be authenticated by the communication adapter 10. As a result of the authentication, the user is subsequently enabled to perform applications, i.e. the user is granted access rights, for example, to specific data, programs, documents or areas.

The communication adapter 10 includes a receiving unit 12 for receiving encrypted credentials 26. Credentials usually include an identity such as a user name or an account name as well as a password by means of which the identity is verified. Passwords are an agreed sequence of characters by means of which an identity can be confirmed. In addition, encrypted credentials 26 may include digital keys or certificates.

The receiving unit 12 includes an interface of the communication adapter 10. The encrypted credentials 26 may be received as a bitstream by the receiving unit 12. The bitstream may comprise encoding such as an ASCII code, for example, for transmitting a character set to the receiving unit 12. Transmission of the bitstream may be effected in a wired manner, for example via an electrical cable or an optical waveguide. Advantageously, transmission of the encrypted credentials 26 to the receiving unit 12 is effected over an air route, for example by means of a radio signal or infrared data transmission. Transmission over an air route has the advantage that no additional openings, where humidity and/or pollution may enter, need to be provided on a housing of the communication adapter 10. In addition, cable connections involve the risk of mechanically insufficient electrical connections, as a result of which electrical signals are insufficiently transmitted. Moreover, a radio link requires no additional hardware such as a suitable cable comprising plugs, for example.

In a transmission of the encrypted credentials 26 by means of a radio signal, the receiving unit 12 may include a transmitter and a receiver for the radio signal. Transmission of the encrypted credentials 26 is effected by suitable means, e.g., for short-haul data transmission between devices via radio or infrared technology. In accordance with embodiments, transmission of the encrypted credentials 26 is effected via a WPAN (Wireless Personal Area Network). Examples of a WPAN are Bluetooth, ZigBee or FIR-IrDA.

The communication adapter 10 further comprises a decryption unit 14 for decrypting the encrypted credentials 26. The decryption unit 14 includes a processor, for example, which decrypts the encrypted credentials 26.

In accordance with embodiments, the decrypted credentials $28_1$ include a first password, a user name, digital keys or certificates. The decryption unit 14 is configured to decrypt the encrypted credentials 26 by means of the second password. Passwords are frequently employed for authenticating persons or devices. Following authentication, the authenticated person may be enabled to use specific data, programs, documents or accesses. Instead of or in addition to a password, biometric data such as fingerprints or iris scans may also be used as a first or second password, for example. Moreover, it is possible, for example, to use a long-lived secret such as, e.g., "name of the first pet" or "mother's birthdate" or entire sentences or acronyms as the first or the second password.

The communication adapter 10 may be configured to store the second password within a memory. The second password is forwarded by the memory to the processor—which decrypts the encrypted credentials 26—for decrypting the encrypted credentials 26. In accordance with embodiments, the communication adapter 10 is configured to receive the second password via an additional input unit. An additional input unit may be, e.g., a keyboard or a keypad for entering the second password. The additional input unit may be connected to the communication adapter 10 via an additional interface. As additional interfaces one may also use the interfaces described above in connection with the receiving unit 12. For example, the second password may be input into the decryption unit 14 via a keyboard additionally connected to Bluetooth. This has the advantage that the second password is not stored within the communication adapter 10 and thus cannot be read out by unauthorized persons and/or attackers, e.g. if the communication adapter 10 is stolen.

In accordance with embodiments, the second password is dependent on an application for which the user authenticates himself/herself. By using different second passwords for different applications one can prevent that—in case decrypted credentials $28_1$ become known—the second password may be found out and that consequently, encrypted credentials 26 of further applications may be decrypted by unauthorized persons. In this context, different second passwords may both be stored within the communication adapter 10 or be entered via the additional interface.

The second password may also depend on a user who wants to authenticate himself/herself. By means of a second password, which is dependent on the user, the level of protection against unauthorized access is also increased. Utilization of different second passwords renders it impossible for any of the users to decrypt the encrypted credentials 26 of other users by means of one's own second password and to thus obtain the credentials of other users.

The communication adapter 10 may be configured to generate the second password in an automated manner. By means of a software, for example, a password may be generated in an automated manner with the aid of a random generator. Passwords generated in an automated manner have the advantage that unlike long-lived secrets, in particular, they are not related to the user, and are therefore difficult to guess even for a well-informed attacker. In addition, with automatically generated passwords it is possible to generate long passwords with advantageously more than 64 characters, particularly advantageously more than 256 characters, which otherwise would have to be awkwardly generated by a user via keyboard entry.

The communication adapter 10 further includes an output unit 16 for outputting the decrypted credentials $28_2$ to a terminal device. What is referred to as a terminal device is a device where the decrypted credentials $28_2$ are to be entered. The terminal device may be a computer or a server, for example.

In embodiments of the communication adapter 10, the output unit 16 is configured with an interface suitable for outputting keyboard signals, it being possible to connect said interface to an interface, which is suitable for inputting keyboard signals, of the terminal device. Interfaces suitable for inputting keyboard signals are PS/2 interfaces or USB interfaces, for example. In accordance with embodiments, the output unit 16 is configured to output the credentials in a format of a standard keyboard. By outputting the credentials in the format of a standard keyboard, the communication adapter 10 may be connected to a terminal of the terminal device which is provided for keyboard entry. Via the interface on the terminal device, which is suitable for inputting keyboard signals, the output unit 16 of the communication adapter 10 may simulate entry of the decrypted credentials $28_2$, for example of a password, on the part of a user on the mobile input device.

In accordance with embodiments, the communication adapter 10 is configured to receive the second password from the terminal device. The interface of the output unit 16 of the communication adapter 10 is configured, in embodiments, not only for transmitting data but also for receiving data. Reception of the second password from the terminal device on the part of the communication adapter 10 also has the advantage that the second password is not stored within the communication adapter 10 and thus cannot be read out by unauthorized persons in case the communication adapter 10 is stolen.

Figure 2:
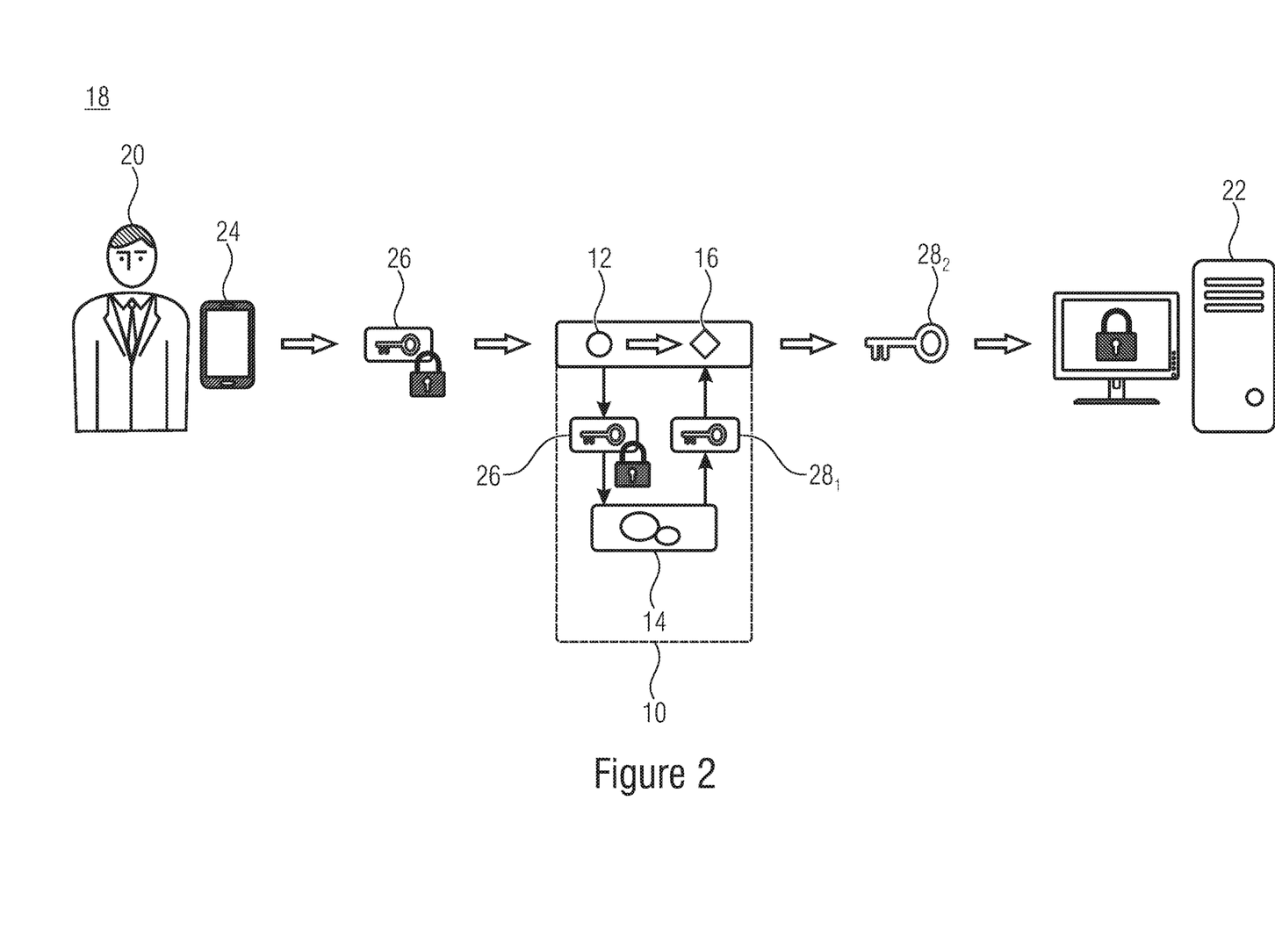
FIG. 2 shows a schematic representation of a system for authentication of a user on a terminal device.

FIG. 2 shows an embodiment of a system 18 for authentication of a user 20 on a terminal device 22. The system 18 includes a communication adapter 10 and a mobile input device 24 configured to store encrypted credentials 26 of a user 20 and to output same to the receiving unit 12 of the communication adapter 10. The system 18 further includes a terminal device 22 configured to receive the decrypted credentials $28_2$ from the output unit. A mobile input device 24, or a mobile terminal device, is a device which may be used by a user 20 for entering and/or storing encrypted credentials 26.

A mobile input device 24 may be a smartphone, a tablet PC or a laptop, for example. Mobile input devices 24 in most cases are personal devices of a user. On account of the personal connection between the user 20 and the mobile input device 24 it is rendered more difficult for an attacker or a fraud to gain access to the encrypted credentials 26 stored within the mobile input device 24. In addition, mobile input devices 24 such as smartphones, for example, are often carried around permanently by the user 20. This offers good protection against access on the part of a fraud. Loss of the mobile input device 24 is also noticed by the user 20 within a narrow timeframe, as a result of which, e.g., accesses to applications can be permanently blocked. Said "carrying around" of the mobile input device 24 additionally has the advantage that the mobile input device 24 is available to the user 20 at any time for entering encrypted credentials 26 to a communication adapter 10.

Additionally, mobile input devices 24 comprise memories which in most cases are sufficiently large for storing a plurality of "pairs" consisting of encrypted passwords and user names. The encrypted passwords and user names may be stored as encrypted credentials 26. Moreover, mobile input devices 24 in most cases have different communication interfaces by means of which they can exchange data with other devices.

In accordance with embodiments, the mobile input device 24 has a program code (software) operated thereon which controls exchange of the encrypted credentials 26 between the mobile input device 24 and the communication adapter 10. The software may include additional functions such as encryption of the credentials, generation of first and second passwords, controlling or monitoring of the communication between the communication adapter 10 and the terminal device 22, as well as storing of the encrypted credentials 26. The software may be operated on a smartphone as an app (mobile app, application), for example.

Embodiments of the mobile input device 24, or the mobile terminal device, in combination with a communication adapter 10 are used for solving the problem of administering and entering safe passwords. For this purpose, the user 20 stores his/her pairs of user names and encrypted passwords on the mobile input device 24 (mobile terminal device) and has sent them to a different device (terminal device 22) for authentication purposes if need be. Once the user 20 has selected a password, said password will also be sent to the communication adapter 10 in an encrypted manner. Thus, the password of the user 20 does not appear in plain text on the mobile input device 24 (mobile terminal device) at any time.

In a particular well-protected area, the communication adapter 10 may have a long-lived secret of the user 20 stored thereon. Only the combination of an encrypted password (encrypted credentials 26) and said long-lived secret (second password) renders decryption possible. Following decryption, the password, which now appears in plain text on the communication adapter 10 (decrypted credentials $28_1$) is processed further. To this end, the data (decrypted credentials $28_1$) is converted by the communication adapter 10 to the format of a standard keyboard and then sent to the terminal device 22 as decrypted credentials $28_2$. The format for transmitting keyboard information may be specified by the PC System Design Guide (see, e.g., reference [9] for IBM compatible devices).

The process of authenticating a user 20 (login) by means of the new method will be described below in an embodiment:

1. The terminal device 22 (device) prompts a user to log in.
2. The user 20 selects the suitable (encrypted) credentials 26 in his/her mobile input device 24 (mobile terminal device).
3. The user 20 plugs his/her communication adapter 10 into the terminal device 22 (device).
4. The communication adapter 10 passes itself off as a standard keyboard toward the terminal device 22 (device).
5. The user 20 prompts his/her mobile input device 24 (mobile terminal device) to transmit the encrypted credentials 26.
6. The mobile input device 24 transmits the encrypted credentials 26 (data) to the communication adapter 10.
7. The communication adapter 10 decrypts the credentials $28_1$ with the aid of the stored second password (long-lived secret).
8. The communication adapter 10 converts the decrypted credentials $28_1$ so that they conform to the format of a standard keyboard.

9. The communication adapter 10 transmits the converted decrypted credentials 28₂ (data) to the terminal device 22 (device).

10. Login is completed. The user 20 removes his/her communication adapter 10 from the terminal device 22 (device).

Figure 3:
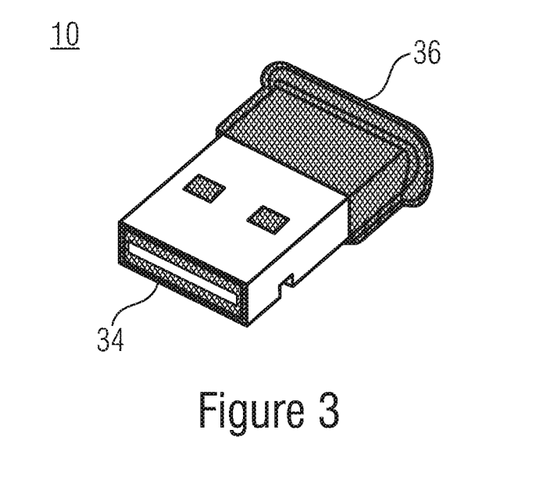
FIG. 3 shows an embodiment of a communication adapter.

FIG. 3 shows an embodiment of a communication adapter 10. The communication adapter 10 includes a USB interface 34 by means of which the communication adapter 10 may be connected to the terminal device. The communication adapter 10 further includes a receiving unit 12 configured by a Bluetooth interface 36, for example. The Bluetooth interface 36 is advantageously arranged in that part of the communication adapter 10 which is located opposite the USB interface 34.

Figure 4:
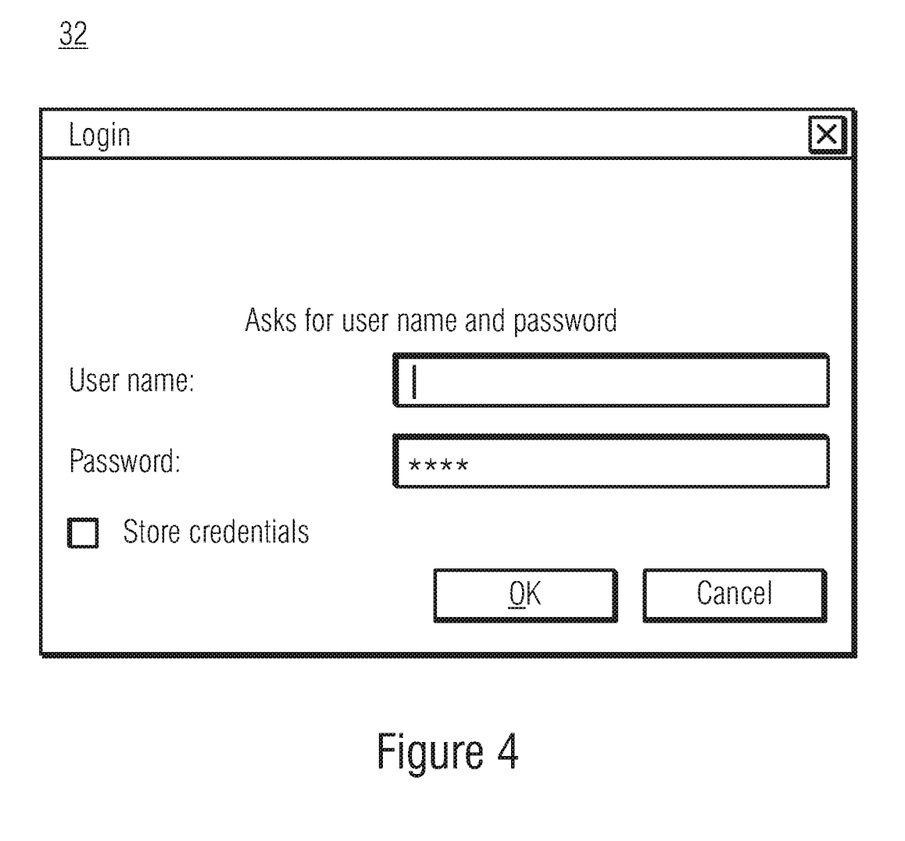
FIG. 4 shows an input mask for access data on a terminal device.

FIG. 4 shows an embodiment of a mask 32 for entering credentials on a terminal device. The credentials may include a user name and a password. By using the communication adapter, which simulates a keyboard entry, the mobile input device and the communication adapter may fill in the input mask 32 in an automated manner.

In accordance with embodiments it is also possible to store encrypted credentials e.g. on a desktop PC as the mobile input device and to send the encrypted credentials, e.g. via a Bluetooth interface of the desktop PC, to the receiving unit of the communication adapter. The communication adapter decrypts the encrypted credentials. Moreover, the communication adapter is connected, e.g., to a USB interface of the desktop PC. The communication adapter returns the decrypted credentials at its output unit to the desktop PC as the terminal device. In the embodiment described, the mobile input device is identical with the terminal device. The communication adapter serves to decrypt the encrypted credentials, decryption of the credentials being possible for a user only by means of the corresponding hardware of the communication adapter.

In accordance with embodiments, the hardware of the communication adapter contains an algorithm for decrypting the encrypted credentials. By implementing the decryption algorithm directly into the hardware of the communication adapter, readout of the algorithm by attackers may be prevented.

In known methods, the user may manually enter his/her data on a keyboard or may install a software on the terminal device itself. In accordance with present embodiments, this is not necessary. For communication, a specific adapter (communication adapter) is used which behaves like a standard keyboard toward the terminal device (device). Thus, no modifications on the terminal device (device) are required (e.g. installation of additional drivers or software), and compatibility with commercial PCs is ensured.

In embodiments, the communication adapter enables receiving encrypted data from a mobile input device (mobile terminal device), decrypting same on the communication adapter (adapter) itself, and subsequently forwarding same in the format of a keyboard.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually do cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. The data carrier, the digital storage medium, or the recorded medium are typically tangible, or non-volatile.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] https://www.bsi.bund.de/DE/Presse/Pressemitteilungen/Presse2011/Pass-wortsicherheit_27012011.html
[2] 1Password; https://agilebits.com/onepassword
[3] KeePass; http://keepass.info/
[4] LastPass; https://lastpass.com/
[5] Password Safe 7; http://www.passwordsafe.de/support/ features/ uebersicht-version-7.html
[6] http://mobilevaults.com/mobilevaults-features
[7] http://myidkey.com/using-myidkey/
[8] http://inputstick.com/
[9] Intel Corporation and Microsoft Corporation, PC99 System Design Guide, 1999.

The invention claimed is:

1. A communication adapter for authentication of a user, the communication adapter comprising:
  a receiving unit comprising a radio link interface for receiving encrypted credentials;
  a decryption unit comprising a processor for decrypting the encrypted credentials;
  an output unit comprising a keyboard signal interface for outputting the decrypted credentials to a terminal device;
  wherein the keyboard signal interface of the output unit can be connected to an interface on the terminal device and wherein the interface on the terminal device is suitable for inputting keyboard signals;
  wherein the radio link interface of the receiving unit is configured to receive the encrypted credentials from a mobile input device;
  wherein the mobile input device is configured to output the encrypted credentials to the radio link interface of the receiving unit via a radio link;
  wherein the processor of the decryption unit is configured to decrypt the encrypted credentials by means of a second password;
  wherein the second password is dependent on an application for which the user authenticates himself/herself;
  wherein the second password is dependent on the user who wants to authenticate himself/herself; or
  wherein the communication adapter being configured to generate the second password in an automated manner.

2. The communication adapter as claimed in claim 1, wherein the keyboard signal interface of the output unit is configured to output the decrypted credentials in a format of a standard keyboard.

3. The communication adapter as claimed in claim 1, wherein the decrypted credentials comprise a first password.

4. The communication adapter as claimed in claim 1, the communication adapter being configured to store the second password within a memory.

5. The communication adapter as claimed in claim 1, the communication adapter being configured to receive the second password via an additional input unit.

6. A system for authentication of a user on a terminal device, comprising:
  a communication adapter for authentication of the user, said communication adapter comprising:
    a receiving unit comprising a radio link interface for receiving encrypted credentials;
    a decryption unit comprising a processor for decrypting the encrypted credentials;
    an output unit comprising a keyboard signal interface for outputting the decrypted credentials to a terminal device;
    wherein the keyboard signal interface of the output unit can be connected to an interface on the terminal device and wherein the interface on the terminal device is suitable for inputting keyboard signals;
    wherein the radio link interface of the receiving unit is configured to receive the encrypted credentials from a mobile input device;
    wherein the mobile input device is configured to output the encrypted credentials to the radio link interface of the receiving unit via a radio link;
  the mobile input device configured to store encrypted credentials from a user and to output same to the radio link interface of the receiving unit of the communication adapter; and
  the terminal device configured to receive the decrypted credentials from the keyboard signal interface of the output unit;
  wherein the processor of the decryption unit is configured to decrypt the encrypted credentials by means of a second password;
  wherein the second password is dependent on an application for which the user authenticates himself/herself;
  wherein the second password is dependent on the user who wants to authenticate himself/herself; or
  wherein the communication adapter being configured to generate the second password in an automated manner.

7. The system as claimed in claim 6, wherein the mobile input device is configured to generate first passwords or second passwords in an automated manner.

8. A method for authentication of a user, the method comprising:
  receiving encrypted credentials from a mobile input device via a radio link;
  decrypting the encrypted credentials;
  outputting the decrypted credentials to a terminal device via an interface, suited for inputting keyboard signals, on the terminal device;
  decrypting the encrypted credentials by means of a second password;
  wherein the second password is dependent on an application for which the user authenticates himself/herself;
  wherein the second password is dependent on the user who wants to authenticate himself/herself; or
  wherein the second password is generated in an automated manner.

9. A non-transitory digital storage medium having a computer program stored thereon to perform the method for authentication of a user, said method comprising:
  receiving encrypted credentials from a mobile input device via a radio link;

decrypting the encrypted credentials;
outputting the decrypted credentials to a terminal device via an interface, suited for inputting keyboard signals, on the terminal device,
decrypting the encrypted credentials by means of a second password;
wherein the second password is dependent on an application for which the user authenticates himself/herself;
wherein the second password is dependent on the user who wants to authenticate himself/herself; or
wherein the second password is generated in an automated manner;
when said computer program is run by a computer.

* * * * *

UNITED STATES PATENT AND TRADEMARK OFFICE
CERTIFICATE OF CORRECTION

| | | |
|---|---|---|
| PATENT NO. | : 10,735,409 B2 | Page 1 of 1 |
| APPLICATION NO. | : 15/467763 | |
| DATED | : August 4, 2020 | |
| INVENTOR(S) | : Erik Krempel et al. | |

It is certified that error appears in the above-identified patent and that said Letters Patent is hereby corrected as shown below:

On the Title Page

Item (54) and in the Specification, Column 1, the title should read as:
AUTHENTICATION STICK Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*